INVENTOR
*Ernst von der Ohe*

INVENTOR
*Ernst von der Ohe*
BY *Bailey, Stephens and Huettig*
ATTORNEYS

March 1, 1966     E. VON DER OHE     3,237,276
CYLINDRICAL ROTOR ASSEMBLY
Filed April 12, 1963     5 Sheets-Sheet 3

INVENTOR
Ernst von der Ohe

BY Bailey, Stephens and Huettig
ATTORNEYS

INVENTOR
Ernst von der Ohe

March 1, 1966  E. VON DER OHE  3,237,276
CYLINDRICAL ROTOR ASSEMBLY
Filed April 12, 1963  5 Sheets-Sheet 5
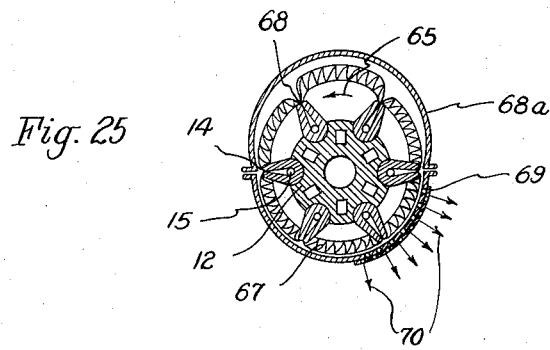
Fig. 25
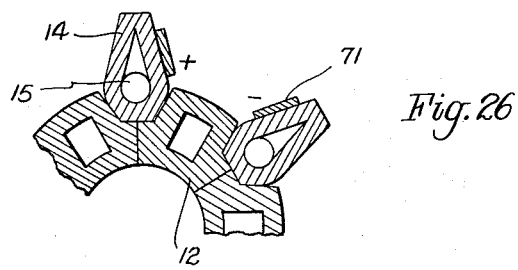
Fig. 26
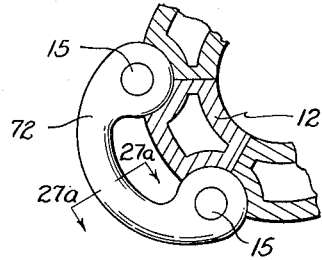
Fig. 27
Fig. 27a
Fig. 27b
INVENTOR
Ernst von der Ohe
BY Bailey, Stephens and Huettig
ATTORNEYS United States Patent Office 3,237,276
Patented Mar. 1, 1966

3,237,276
CYLINDRICAL ROTOR ASSEMBLY
Ernst von der Ohe, Albrechtstrasse 28,
Wiesbaden, Germany
Filed Apr. 12, 1963, Ser. No. 272,763
Claims priority, application Germany, May 4, 1962,
O 8,727
6 Claims. (Cl. 29—121)

This invention relates to a cylindrical rotor assembly and, in particular, is directed to a hollow cylindrical rotor built up from standardized elements.

The object of this invention is to produce a rotor assembled from a minimum number of standardized shapes and adapted to be used for a plurality of rotor designs. The term rotor as herein used is generic for any kind of a rotatable body regardless of size, shape and design.

In general, the objects of the invention are obtained by assembling a plurality of elongated cylindrical segments into a core. Each segment is hollow and has a rib so that corresponding grooves are formed between adjacent ribs on the outer surface of the core. Standardized tool members are seated in these grooves and carry tool pieces. Holding rods extend through the tool members and are engaged by end rings for holding the tool members in place. Bolt means or tie rods extend between the rings on the opposite ends of the core to secure the rings to the core. A cap disc closes the opening in each end ring to complete the assembly. The cylindrical segments forming the core are not subject to the centrifugal forces of the tool pieces and therefor can be composed of lightweight materials, such as synthetic plastics, aluminum alloys and the like, inasmuch as the centrifugal forces are transmitted through the tie rods to the end rings. The end rings or closure disc can be splined to a shaft for the rotation of the assembly. Preferably the standardized shapes have diameters of 60, 90, 190 and 320 mm. The rotor assemblies can be coupled in series by means of elastic joints to attain a length of as much as 2.5 meters.

The means by which the objects of the invention are obtained are disclosed more fully with reference to the accompanying drawings in which.

Figure 20:
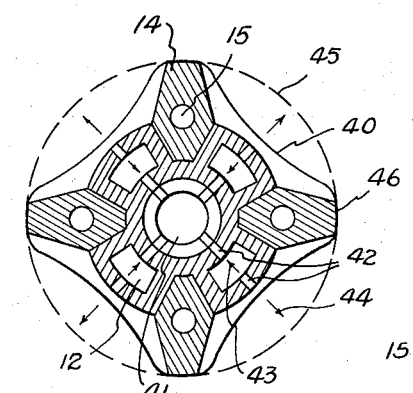
Figure 21:
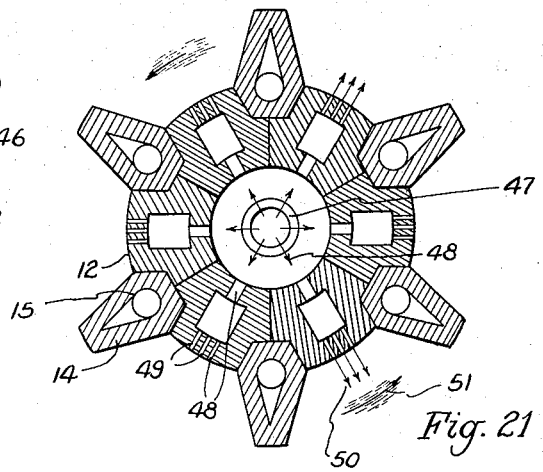
Figure 22:
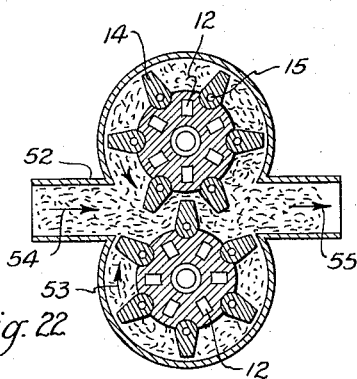
Figure 23:
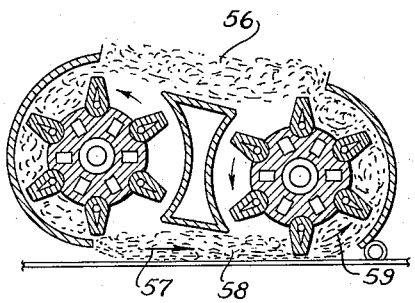
Figure 24:
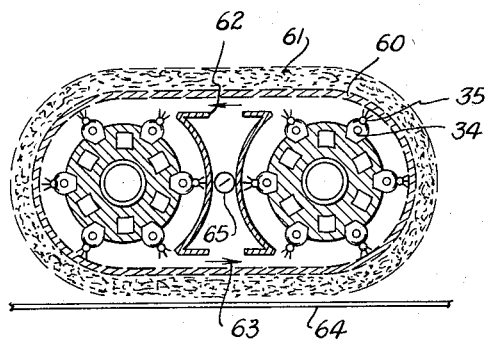

FIGURES 9 to 19, inclusive, are respectively diagrammatic end views of tool members carrying different kinds of tool pieces;

FIGURE 20 is a cross-sectional view through an assembly for a rotor enclosed by an elastic tube;

FIGURE 21 is a cross-sectional view through an assembly for a rotor provided with radial fluid passageways;

FIGURE 22 is a diagrammatic cross-sectional view through an assembly of two rotors forming a pump;

FIGURE 23 is a similar view of a pair of rotors arranged for conveying a material to be treated;

FIGURE 24 is also a similar view of a pair of rotors used to drive an endless belt;

FIGURE 25 is a diagrammatic cross-sectional view through an assembly for a rotor enclosed in a sleeve of porous fabric;

FIGURE 26 is a partial cross-sectional view through an assembly in which the tool members carry electrode elements;

FIGURE 27 is a similar view of a rotor carrying a kneading blade;

FIGURE 27a is a cross-sectional view taken on the line 27a—27a of FIGURE 27; and FIGURE 27b is a modification of FIGURE 27a.

In FIGURES 1 to 8, the diameter is the outer diameter of the tool and the figures are scaled as follows: FIGURES 1 to 4, 1:2.5; and FIGURES 5 to 8, 1:1. In all rotor assemblies, the basic structural shape is the same and only the number of cylindrical segments with their corresponding carried elements vary with the rotor diameter.

Figure 1:
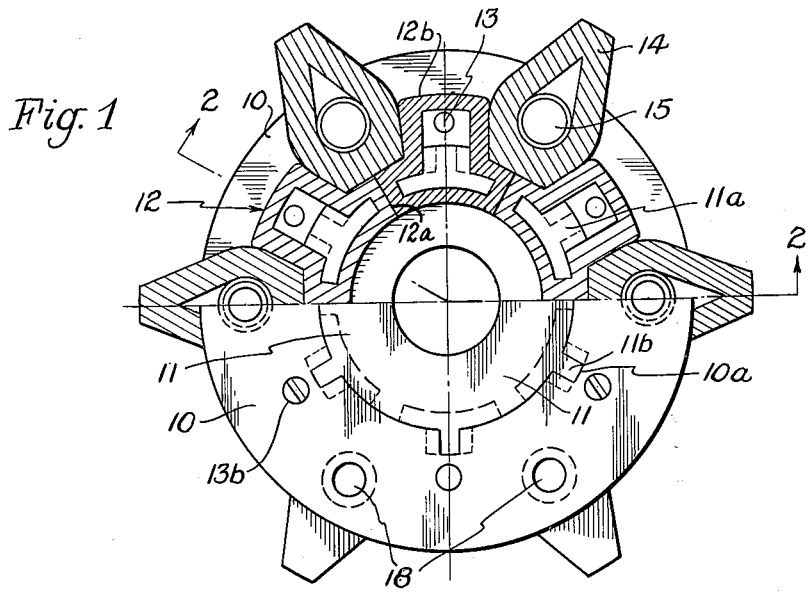
FIGURE 1 is an end view, partially in section, of an assembly for a rotor having a diameter of 320 mm.
Figure 2:
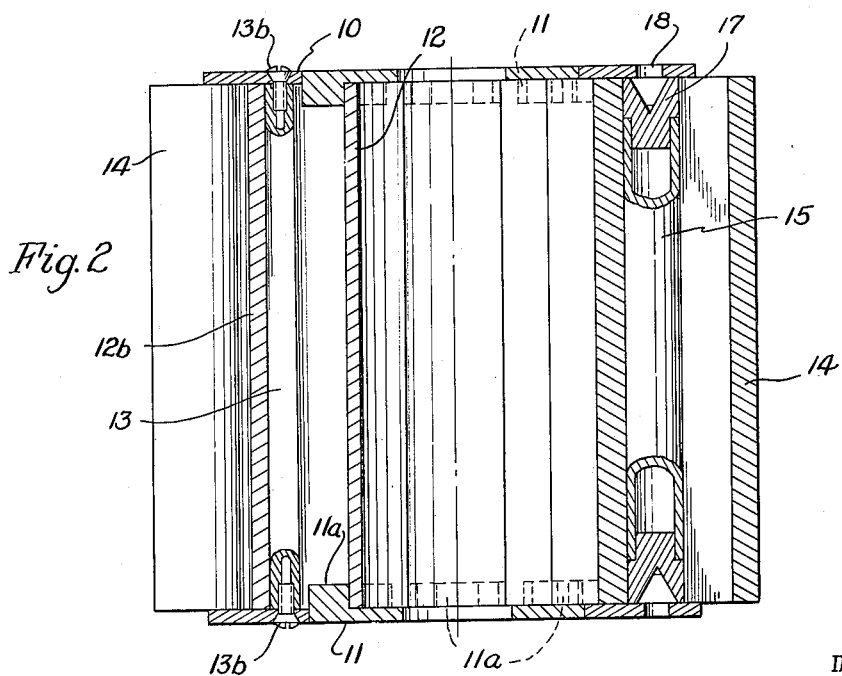
FIGURE 2 is a cross-sectional view taken along the line 2—2 of FIGURE 1.

As shown in FIGURES 1 and 2, the rotor core is assembled between end pieces composed of an outer ring 10 and an inner cap disc 11 which closes the opening in the ring. Hollow cylindrical segments 12 are assembled with their longitudinal edges 12a abutting to form a hollow core. Each segment 12 has a longitudinally extending rib 12b so that corresponding grooves are formed between each pair of adjacent ribs. Bolt means or tie rods 13 extend through the hollow ribs 12b and are fastened to the end rings 10 by means of screws 13b. This is done after the tool members 14 have been seated in their respective longitudinal grooves and secured in place by means of holding rods 15 which extend through the hollow tool members. The ends of the rods 15 have conically recessed fittings 17 which are engaged by complementary cones 18 formed on the inner surfaces of rings 10 so that the holding rods are rigidly held in position. From this construction, it is apparent that centrifugal forces occurring on the segments 12 and the members 14 are transferred to the end rings 10. Disc 11 has inwardly extending annular flanges 11a which tightly fit into corresponding openings in hollow segments 12 so that the transfer of the centrifugal forces is further ensured. Cap disc 11 also has radially extending tongues 11b which fit into corresponding slots 10a in rings 10 to complete the structural integrity of the assembly.

Figure 3:
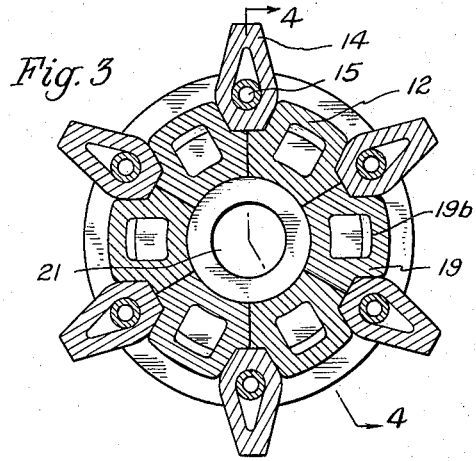
FIGURE 3 is a cross-sectional view of an assembly for a rotor having a diameter of 190 mm.
Figure 4:
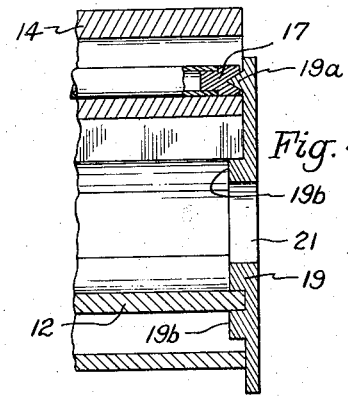
FIGURE 4 is a cross-sectional view taken along the line 4—4 of FIGURE 3.
Figure 5:
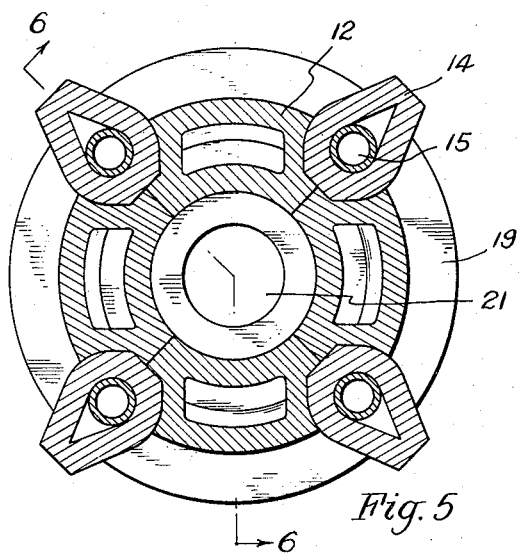
FIGURE 5 is an assembly for a rotor having a diameter of 90 mm.
Figure 6:
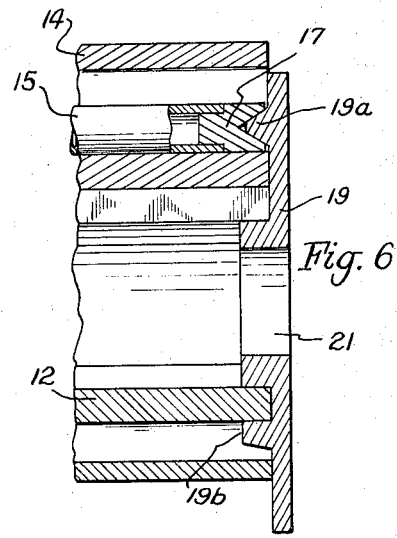
FIGURE 6 is a cross-sectional view taken on the line 6—6 of FIGURE 5.

In the modification of FIGURES 3 and 4, the rotor assembly is composed of three basic parts with the tie rods 13 of FIGURE 1 being omitted. This is the construction for the smaller types of rotors. The end ring 10 and the cap disc 11 of FIGURE 1 are combined into a single ring 19 having the pressure cones 19a and the annular flanges 19b. This assembly is temporarily held together by an axially extending bolt and washers. This bolt is later removed so that the rotor can be mounted on a drift shaft. Both the drive shaft and the ring 19 have a polygonal cross-section in order to key the shaft to the rotor.

The number of cylindrical segments 12 used to bond a rotor depends upon the diameter required of the finished rotor. Four segments are used for a diameter of 60 to 90 mm., six segments for diameters of from 190 to 320 mm., and eight segments for diameters of from 320 to 400 mm. Six segments are used for the rotor of FIGURE 3, while four segments are used for the rotors of FIGURES 5 and 7.

Figure 7:
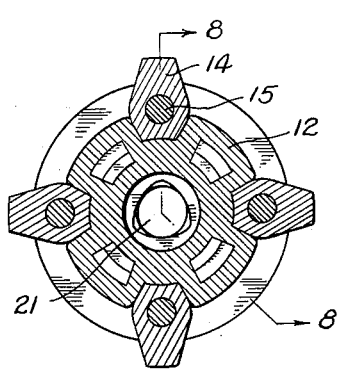
FIGURE 7 is an assembly for a rotor having a diameter of 60 mm.

FIGURES 1 to 5 are illustrative of so-called homogeous tools. For example, they can be conveying tools having elastic tool members 14 composed of wear resistant rubber, porous plastics, fibrous material mixes and so forth; elastic solid bodies as indicated in FIGURE 7, made of spongy plastics or chemically treated fibers; or rigid hollow bodies indicated in FIGURES 1 and 2 composed of refractory materials, porcelain, steel or sheet metal. Other tools in this group are hammers, cutting and tearing tools of from 3 to 10 mm. thick and made of steel, brass or plastic separated by spaces.

Figure 8:
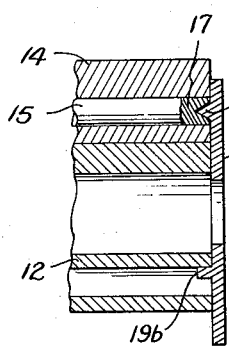
FIGURE 8 is a cross-sectional view taken on the line 8—8 of FIGURE 7.

FIGURES 7 and 8 show the smallest practical size of the rotor. Each outer ring 19 is provided with the curved flange 19b. Segments 12 are composed of a lightweight metal or plastic as an integral unit produced by extrusion or die casting, for example.

In FIGURES 9 to 19, the individual tool members are shown carrying different kinds of tool pieces, which are designated as compound tools. In other words, the tool pieces per se carried by the tool members are composed of steel, ceramics, or the like, bonded to the tool members 14.

Figure 9:
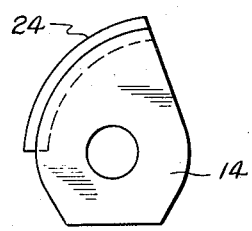
Figure 10:
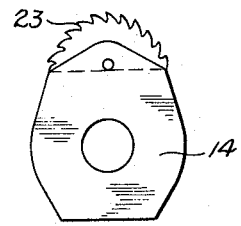
Figure 11:
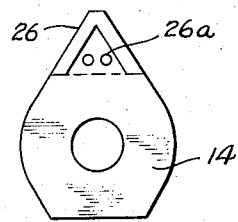
Figure 12:
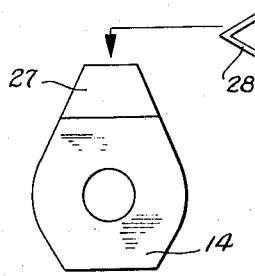
Figure 13:
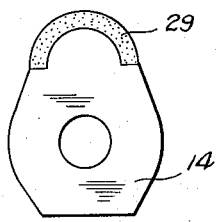
Figure 14:
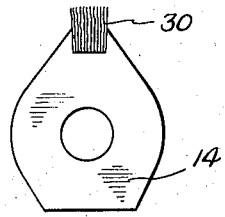
Figure 15:
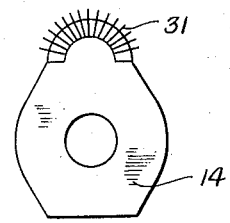
Figure 16:
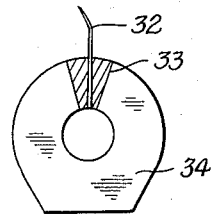
Figure 17:
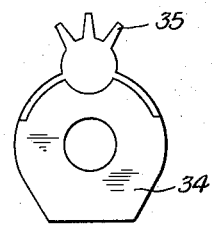
Figure 18:
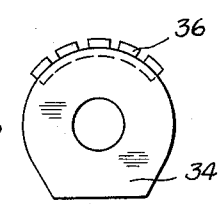

For example, tool member 14 in FIGURE 9 carries a circular knife 24. In FIGURE 10, tool member 14 carries a circular saw segment 25. In FIGURE 11, the tool piece is a pointed knife 26 secured by a rivet 26a. FIGURE 12 shows a hammer tool piece 27 which has a wedge-shaped cross-section 28 as shown in FIGURE 12a. In FIGURE 13, the tool piece is a semi-circular grindstone or rasping body 29. FIGURE 14 shows a brush 30 for the tool piece. FIGURE 15 has a comb 31. FIGURE 16 shows a paddle blade 32 cast in a retaining base 33 carried by tool member 34. In FIGURE 17, the tool piece is an elastic claw and catching piece 35. In FIGURE 18, the tool piece is a threshing bar 36.

The tool member 34 of FIGURES 16 to 18 has a rounded outer surface which does not extend beyond the outer surface of the ribs 12b on the rotor.

Figure 19:
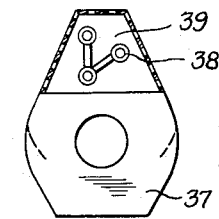

Combination type tools are shown in FIGURES 19, 20, 25 and 26. In FIGURE 19, tool member 37 carries electric heating tubes 38 which are covered by a perforated hood 39. This is illustrative of different kinds of illuminating and radiating bodies which can be constructed according to this invention. The electrical elements receive their power through conventional slip rings.

In FIGURE 20, the tool members 14 are enclosed within a flexible tube or sleeve 40. This sleeve 40 is depressed into the groove between the ribs by external pressure. The tube also has this same position when air is drawn from the central opening 41 of the rotor by reason of fluid passageways 42 extending radially through segments 12. The air then flows in the direction of the arrow 43. When not subjected to air pressure, and as the rotor revolves, the tube swells out by centrifugal force in the direction of the arrow 44 to the position shown by dotted line 45.

In FIGURE 21, the rotor assembly is such that gas enters opening 47 and then flows radially in the direction of arrows 48 through radially extending gas passageways 49 in segments 12. Thus a mixture of fluent materials emerging in the direction of the arrows 50 is carried along in the direction of the arrow 51.

Three additional examples of the use of the rotors of this invention are shown in FIGURES 22 to 24. In FIGURE 22, the rotors are vertically superimposed in a pump housing 52 to convey material 53 into and out of the pump in the direction of the arrows 54 and 55 respectively. The tool members 14 are profile hollow bodies of the homogeneous type.

In FIGURE 23, the rotors are mounted inclined to the horizontal. Both rotate in the same direction as shown by the arrow 57 to produce a flow of material by reason of the tool members used as conveying blades. The material 56 is conveyed by the lefthand rotor to the body area 58 where it is treated and then lifted by the righthand rotor in the direction of arrow 59 for recirculation. The adding of the treating substances is not shown.

In FIGURE 24, the rotors are provided with the tool members 34 and the tool pieces 35 of FIGURE 17 and two rotors are mounted in a horizontal plane. They drive an endless belt 60 covered with a layer of glued on fiber cushions 61 with the belt rotating in the direction of the arrow 62. The entire device then brushes in the direction of the arrow 63 across a floor 64. The device thus picks up dust particles which are retained in chemically treated fibers in the cushion 61. The rotors are urged away from each other and against the endless belt 60 by spring means 65. In the schematic showing, the rotors are not clamped.

In FIGURE 25, a schematic arrangement somewhat according to the principle of FIGURE 20 is shown. The rotor is adapted to rotate in the direction of the arrow 66. Elastic coil springs 67 are secured to the apexes 68 of adjacent tool members 14. The springs are covered with an alkaline saturated fiber coating. The rotor revolves in a housing 68a having a closely fitting bottom portion including a sieve 69 and an expanded upper housing portion. As the rotor rotates, the spring held fiber covering expands in the upper enlarged portion of the housing because of centrifugal force. In the lower portion of the housing, the spring held fiber is pressed against the inner wall of the housing so that a flexible filter is moved over the sieve 69 and the filtered material emerges in the direction of the arrows 70.

In FIGURE 26, the tool members 14 hold longitudinally extending electrical conducting elements 71, each of which is subdivided into little electric fields charged alternately with positive and negative current. For example, the outer plates act as anodes on one side and cathodes on the other. The space between the facing surfaces of plate 71 thus represents an area in which electric arcs and glowing ionization occurs.

In FIGURE 27, the tool member carries a crescent-shaped kneading tool 72 which has its free ends joined to the holding rods 15 in adjacent grooves. This tool piece 72 has a cross-sectional shape 73 as shown in FIGURE 27a or a pointed and notched cross-section 74 as shown in FIGURE 27b.

Having now described the means by which the objects of the invention are obtained. I claim:

1. A rotor assembly comprising a plurality of hollow cylindrical segments assembled with their longitudinal edges abutting to form a hollow rotor core, a longitudinal rib on the outer surface of each segment for forming grooves between adjacent ribs on said outer surface, a tool member seated in each groove, respectively, a holding rod in each tool member, a ring on each end of said core engaging the ends of each holding rod, and bolt means extending through said segments for securing said rings to each other and to said core.

2. A rotor as in claim 1, further comprising a cap disc enclosing the opening in each ring on an end of said core.

3. A rotor as in claim 2, further comprising cone elements on each ring pressed against the ends of each holding rod, and arcuate flanges on each cap disc engaging the inner wall of said core.

4. A rotor as in claim 1, further comprising a tool piece carried by each tool member.

5. A rotor as in claim 1, further comprising a plurality of longitudinally spaced fluid passageways extending radially through each hollow segment.

6. A rotor as in claim 1, said tool member comprising a crescent-shaped kneading tool having its ends seated in adjacent grooves, respectively.

(References on following page)

References Cited by the Examiner
UNITED STATES PATENTS

| | | | |
|---|---|---|---|
| 480,930 | 8/1892 | Lindsay | 74—460 |
| 1,238,310 | 8/1917 | Logan | 15—183 |
| 1,309,695 | 7/1919 | Remmele | 15—183 |
| 1,843,287 | 2/1932 | Larsson | 51—206.5 |
| 2,055,108 | 9/1936 | Hokonson | 15—183 |
| 2,221,853 | 11/1940 | Wilson | 15—183 |
| 2,465,231 | 3/1949 | Hollis | 15—183 |
| 2,600,613 | 6/1952 | Bruner et al. | 15—183 |
| 2,733,556 | 2/1956 | Whitesell | 51—206.5 |
| 3,069,922 | 12/1962 | Harvey | 74—243 |

LAURENCE V. EFNER, *Primary Examiner.*